(12) United States Patent
Zhou

(10) Patent No.: US 12,454,275 B2
(45) Date of Patent: Oct. 28, 2025

(54) VEHICLE SENSOR DATA PROCESSING METHOD AND SYSTEM

(71) Applicant: SHENZHEN YINWANG INTELLIGENT TECHNOLOGIES CO., LTD., Shenzhen (CN)

(72) Inventor: Wei Zhou, Shanghai (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 207 days.

(21) Appl. No.: 17/992,067

(22) Filed: Nov. 22, 2022

(65) Prior Publication Data

US 2023/0085381 A1    Mar. 16, 2023

Related U.S. Application Data

(63) Continuation of application No. PCT/CN2021/090235, filed on Apr. 27, 2021.

(30) Foreign Application Priority Data

May 25, 2020  (CN) .................. 202010450647.X

(51) Int. Cl.
*B60W 50/06*        (2006.01)
*G01S 13/86*        (2006.01)
*G06F 18/25*        (2023.01)

(52) U.S. Cl.
CPC ............ *B60W 50/06* (2013.01); *G06F 18/25* (2023.01); *G06F 18/251* (2023.01); *B60W 2556/35* (2020.02); *G01S 13/865* (2013.01); *G01S 13/867* (2013.01)

(58) Field of Classification Search
None
See application file for complete search history.

(56) References Cited

U.S. PATENT DOCUMENTS

| | | | |
|---|---|---|---|
| 10,534,368 B2 | 1/2020 | Sethu et al. | |
| 2010/0007476 A1 | 1/2010 | Klotz et al. | |
| 2018/0367871 A1 | 12/2018 | Zeng | |
| 2019/0049986 A1 | 2/2019 | Georges et al. | |
| 2021/0224617 A1* | 7/2021 | Igarashi | G01S 13/931 |

FOREIGN PATENT DOCUMENTS

| | | | |
|---|---|---|---|
| DE | 102017126877 A1 * | 5/2018 | G01S 13/867 |
| EP | 2951804 B1 | 3/2017 | |
| WO | 2017119089 A1 | 7/2017 | |

OTHER PUBLICATIONS

Extended European Search Report in European Appln No. 21814487.1, dated Sep. 18, 2023, 5 pages.
EP Communication Pursuant to Article 94(3) EPC in European Appln. No. 21814487.1, mailed on Sep. 2, 2025, 5 pages.

* cited by examiner

*Primary Examiner* — Christian Chace
*Assistant Examiner* — Shayne M. Gilbertson
(74) *Attorney, Agent, or Firm* — Fish & Richardson P.C.

(57) ABSTRACT

Vehicle sensor data processing methods, apparatuses and system are provided. In an example method, some sensors are configured to output sensed raw data, and other sensors are configured to output target information determined based on sensed raw data. A fusion component performs data fusion after receiving the raw data and the target information from the sensors, to determine target information.

13 Claims, 3 Drawing Sheets

VEHICLE SENSOR DATA PROCESSING METHOD AND SYSTEM

CROSS-REFERENCE TO RELATED APPLICATIONS

This application is a continuation of International Application No. PCT/CN2021/090235, filed on Apr. 27, 2021, which claims priority to Chinese Patent Application No. 202010450647.X, filed on May 25, 2020. The disclosures of the aforementioned applications are hereby incorporated by reference in their entireties.

TECHNICAL FIELD

This application relates to the field of data processing, and specifically, to a vehicle sensor data processing method and system.

BACKGROUND

With rapid development of artificial intelligence, the intelligent automobile industry is deeply influenced. An intelligent vehicle can sense an ambient environment of the vehicle by using a plurality of external environment sensors disposed on the intelligent vehicle, to analyze safe and dangerous states of vehicle driving, control the vehicle to arrive at a destination based on an intention of a driver, and finally achieve an objective of performing an autonomous driving operation on behalf of a person. Currently and in the near future, external environment sensors disposed on vehicles mainly have three types: image sensors, millimeter-wave radar sensors, and laser radar sensors. Other auxiliary sensors may also be used, including ultrasonic radar sensors, inertial measurement units (IMU), and the like. Currently, intelligent vehicle functions such as adaptive cruise control, assisted parking, lane centering control, and automatic emergency braking are implemented mainly depending on fusion and sensing of sensors. This results in a large quantity of sensors on an intelligent vehicle. How to fuse and process a large amount of data from a plurality of sensors becomes a research hotspot of persons skilled in the art.

SUMMARY

This application provides a vehicle sensor data processing method and system, to reduce overheads caused by transmission and processing of a large amount of data while ensuring fusion and sensing performance.

According to a first aspect, a vehicle sensor data processing system is provided. The system includes at least two sensors and a fusion module. The at least two sensors include a first sensor and a second sensor, where the first sensor is configured to output raw data sensed by the first sensor, the second sensor is configured to output first target information, and the first target information is determined by the second sensor based on sensed raw data. The fusion module includes a first fusion module, where the first fusion module is configured to determine second target information based on raw data from at least one first sensor and first target information from at least one second sensor.

To be specific, the first target information is related information that is of a target and that is determined by the second sensor by processing the sensed raw data, and the second target information is related information that is of the target and that is determined after the first fusion module fuses the raw data from the first sensor and the first target information from the second sensor. The first target information and/or the second target information include/includes one or more of the following:

a type of the target, a speed of the target, a distance of the target, a size of the target, or an orientation of the target.

It should be noted that when the first target information includes a plurality of pieces of the foregoing information, the first target information may also be referred to as a first target information set.

According to the foregoing solution, a type of data output by some sensors in the system is raw data, and some sensors output first target information obtained after the raw data is processed. That is, some sensors output the raw data with a large transmission amount, and some sensors output the target information with a small transmission amount, to reduce a data transmission amount of the system and overheads caused by data processing while ensuring fusion and sensing performance.

With reference to the first aspect, in some implementations of the first aspect, the fusion module further includes a second fusion module. The second fusion module is configured to output third target information to the first fusion module based on the raw data from the at least one first sensor. The first fusion module specifically determines the second target information based on the raw data from the at least one first sensor, the first target information from the at least one second sensor, and the third target information.

According to the foregoing solution, the second fusion module fuses the raw data of the sensor to determine the third target information, and outputs the third target information to the first fusion module, so that some raw data is fused in the second fusion module. In this way, a data transmission amount in the system and data processing overheads of the first fusion module can be reduced.

With reference to the first aspect, in some implementations of the first aspect, an output data type of a sensor in the at least two sensors is configured as the raw data or the first target information. A sensor whose output data type is configured as the raw data is the first sensor, and a sensor whose output data type is configured as the first target information is the second sensor. Alternatively, a sensor in the at least two sensors is configured as the first sensor or the second sensor.

According to the foregoing solution, an output data type of a sensor may be configured as raw data or target information based on a situation. In this way, the system can perform adaptation based on an application scenario, to improve flexibility of system reference.

With reference to the first aspect, in some implementations of the first aspect, the system further includes a configuration module, configured to configure the sensor in the at least two sensors.

With reference to the first aspect, in some implementations of the first aspect, at least one sensor in the at least two sensors obtains capability information of the fusion module and/or output data type information of the sensor, and determines, based on the capability information and/or the output data type information, to output raw data or first target information.

According to the foregoing solution, an output data type of a sensor may be configured as raw data or target information based on a situation. In this way, the system can perform adaptation based on an application scenario, to improve flexibility of system reference.

With reference to the first aspect, in some implementations of the first aspect, the system further includes a control module, configured to send the capability information of the fusion module and/or the output data type information to the sensor in the at least two sensors.

With reference to the first aspect, in some implementations of the first aspect, the control module is further configured to control a vehicle status based on the second target information, or the control module is further configured to determine vehicle control decision-making information based on the second target information, and control a vehicle status based on the vehicle control decision-making information.

By way of example but not limitation, the control module may be referred to as a decision-making control module.

With reference to the first aspect, in some implementations of the first aspect, the system further includes a decision-making module, configured to output vehicle control decision-making information based on the second target information. With reference to the first aspect, in some implementations of the first aspect, the control module controls the vehicle status based on the vehicle control decision-making information from the decision-making module.

According to a second aspect, a vehicle sensor data processing method is provided. The method is performed by a vehicle sensor data processing system, where the system includes at least two sensors and a fusion module, and the at least two sensors include a first sensor and a second sensor.

The method includes: The first sensor outputs raw data sensed by the first sensor; the second sensor outputs first target information, where the first target information is determined by the second sensor based on sensed raw data; and a first fusion module determines second target information based on raw data from at least one first sensor and first target information from at least one second sensor, where the fusion module includes the first fusion module.

With reference to the second aspect, in some implementations of the second aspect, the fusion module further includes a second fusion module, the second fusion module outputs third target information to the first fusion module based on the raw data from the at least one first sensor, and the determining second target information based on raw data from at least one first sensor and first target information from at least one second sensor includes: determining the second target information based on the raw data from the at least one first sensor, the first target information from the at least one second sensor, and the third target information.

With reference to the second aspect, in some implementations of the second aspect, an output data type of a sensor in the at least two sensors is configured as the raw data or the first target information, where a sensor whose output data type is configured as the raw data is the first sensor, and a sensor whose output data type is configured as the first target information is the second sensor; or a sensor in the at least two sensors is configured as the first sensor or the second sensor.

With reference to the second aspect, in some implementations of the second aspect, the system further includes a control module, and the method further includes: The control module configures the output data type of the sensor in the at least two sensors or configures a type of the sensor in the at least two sensors.

With reference to the second aspect, in some implementations of the second aspect, at least one sensor in the at least two sensors obtains capability information of the fusion module and/or output data type information of the sensor, and determines, based on the capability information and/or the output data type information, to output raw data or first target information.

With reference to the second aspect, in some implementations of the second aspect, the system further includes a control module, and the method further includes: The control module sends the capability information of the fusion module and/or the output data type information to the sensor in the at least two sensors.

With reference to the second aspect, in some implementations of the second aspect, the method further includes: The control module controls a vehicle status based on the second target information, or the control module determines vehicle control decision-making information based on the second target information, and controls a vehicle status based on the vehicle control decision-making information.

By way of example but not limitation, the control module may be referred to as a decision-making control module.

With reference to the second aspect, in some implementations of the second aspect, the system further includes a decision-making module, and the method further includes: The decision-making module outputs the vehicle control decision-making information based on the second target information.

With reference to the second aspect, in some implementations of the second aspect, the control module controls the vehicle status based on the vehicle control decision-making information from the decision-making module.

According to a third aspect, a vehicle sensor data processing method is provided. The method includes: A first fusion module receives raw data sensed by at least one first sensor, and receives first target information from at least one second sensor, where the first target information is determined by the second sensor based on sensed raw data; and the first fusion module determines second target information based on the raw data and the first target information.

With reference to the third aspect, in some implementations of the third aspect, the determining second target information based on the raw data and the first target information includes: determining the second target information based on the raw data, the first target information, and third target information, where the third target information is from a second fusion module.

According to a fourth aspect, a vehicle sensor data processing apparatus is provided, including a processor. The processor is coupled to a memory, and may be configured to execute instructions in the memory, to implement the method according to any one of the second aspect or the third aspect and the possible implementations of the second aspect or the third aspect. Optionally, the vehicle sensor data processing apparatus further includes the memory. Optionally, the vehicle sensor data processing apparatus further includes a communications interface, and the processor is coupled to the communications interface. The communications interface may be an input/output interface.

Optionally, the input/output interface may be an input/output circuit.

According to a fifth aspect, a processor is provided, including an input circuit, an output circuit, and a processing circuit. The processing circuit is configured to: receive a signal through the input circuit, and transmit a signal through the output circuit, so that the processor performs the method according to any one of the second aspect or the third aspect and the possible implementations of the second aspect or the third aspect.

In a specific implementation process, the processor may be one or more chips, the input circuit may be an input pin, the output circuit may be an output pin, and the processing circuit may be a transistor, a gate circuit, a trigger, any logic circuit, or the like. An input signal received by the input circuit may be, for example but not limited to, received and input by a receiver. A signal output by the output circuit may be, for example but not limited to, output to a transmitter and transmitted by the transmitter. The input circuit and the output circuit may be a same circuit, where the circuit is separately used as the input circuit and the output circuit at different moments. Specific implementations of the processor and the circuits are not limited in embodiments of this application.

According to a sixth aspect, a processing apparatus is provided, including a processor and a memory. The processor is configured to: read instructions stored in the memory, input data or information by using an input interface, and output data or information by using an output interface, to perform the method according to any one of the second aspect or the third aspect and the possible implementations of the second aspect or the third aspect.

Optionally, there may be one or more processors, and there may be one or more memories.

Optionally, the memory may be integrated with the processor, or the memory and the processor are separately disposed.

In a specific implementation process, the memory may be a non-transitory (non-transitory) memory, such as a read-only memory (ROM). The memory and the processor may be integrated into one chip, or may be separately disposed on different chips. A type of the memory and a manner in which the memory and the processor are disposed are not limited in embodiments of this application.

The processing apparatus in the sixth aspect may be one or more chips. The processor in the processing apparatus may be implemented by using hardware, or may be implemented by using software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, or may be located outside the processor and exist independently.

According to a seventh aspect, a computer program product is provided. The computer program product includes a computer program (which may also be referred to as code or instructions). When the computer program is run, a computer is enabled to perform the method according to any one of the second aspect or the third aspect and the possible implementations of the second aspect or the third aspect.

According to an eighth aspect, a computer-readable storage medium is provided. The computer-readable storage medium stores a computer program (which may also be referred to as code or instructions). When the computer program is run on a computer, the computer is enabled to perform the method according to any one of the second aspect or the third aspect and the possible implementations of the second aspect or the third aspect.

DESCRIPTION OF EMBODIMENTS

The following describes the technical solutions of this application with reference to the accompanying drawings.

The technical solutions in embodiments of this application may be applied to an autonomous driving scenario, for example, may be applied to various vehicles. With continuous development of autonomous driving technologies, cruise control, light control, airbag control, and the like all require a large quantity of sensors to sense a change of an environment in which a vehicle is located. An increase in a quantity of sensors brings data processing pressure to a system. If each sensor independently processes sensed data and outputs target information, some feature information of a target may be lost, and target information obtained after multi-sensor fusion is inaccurate. If each sensor outputs sensed raw data, transmission and processing of raw data cause high system overheads because of a large amount of the raw data. This application provides a vehicle sensor data processing method and system. Some sensors are configured to output raw data, and the other sensors are configured to output target information. A fusion module is capable of fusing raw data and target information, and fuses the raw data and the target information received from the sensors to determine target information, so that a decision-making unit makes an accurate vehicle control decision. In this way, a data transmission amount of a system and system overheads caused by data processing can be reduced while fusion and sensing performance is ensured.

Figure 1:
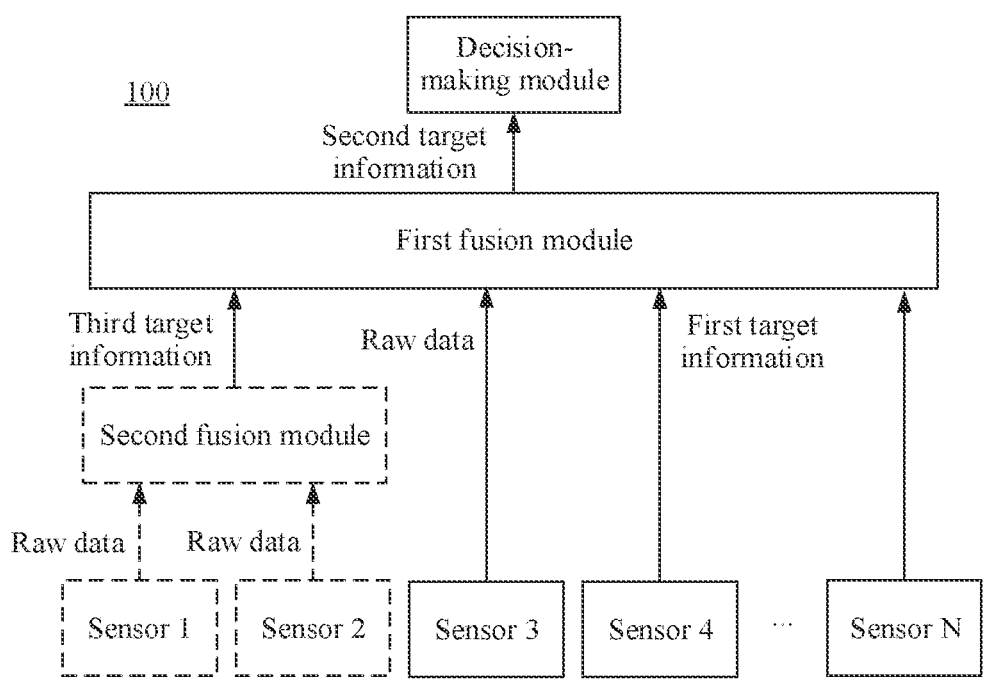
FIG. 1 is a schematic diagram of an architecture of a vehicle sensor data processing system applicable to an embodiment of this application.

FIG. 1 is a schematic diagram of an architecture of a vehicle sensor data processing system applicable to an embodiment of this application.

As shown in FIG. 1, the vehicle sensor data processing system 100 may include at least two sensors and a fusion module. The at least two sensors are configured to sense an external environment of a vehicle to obtain sensed raw data. The at least two sensors may include a first sensor and a second sensor. The first sensor, for example, sensors 1, 2, and 3 in FIG. 1, may output raw data sensed by the first sensor. The second sensor, for example, a sensor 4 in FIG. 1, may determine and output first target information based on data sensed by the second sensor. The fusion module includes a first fusion module. The first fusion module may be connected to a plurality of sensors, and can fuse the raw data and the first target information from the sensors to determine second target information.

Optionally, the fusion module of the system 100 may further include at least one second fusion module. The second fusion module may be connected to a plurality of sensors, and can fuse the raw data from the sensors, and output third target information to the first fusion module. When the system includes the second fusion module, the first fusion module determines the second target information with reference to the third target information. In other words, the first fusion module fuses the raw data and the first target information from the sensors and the third target information from the second fusion module, and then determines the second target information.

Optionally, the system 100 may further include a decision-making module. The decision-making module may output vehicle control decision-making information based on the second target information determined by the first fusion module, so that the system processes data sensed by a plurality of sensors to implement vehicle control. The decision-making module and the first fusion module may be a same module. For example, the first fusion module has a decision-making function, and determines the vehicle control decision-making information after fusing the data and the target information. Alternatively, the decision-making module and the first fusion module are different modules. The first fusion module fuses the data and the target information to determine the second target information, and outputs the second target information to the decision-making module. The decision-making module determines the vehicle control decision-making information based on the input second target information.

It should be noted that FIG. 1 shows an example of a vehicle sensor data processing system according to this application. A quantity of sensors included in the system, a quantity of sensors connected to the first fusion module, a quantity of second fusion modules, and a quantity of sensors connected to the second fusion module may be determined based on specific implementation. This is not limited in this application.

The following describes in detail embodiments provided in this application with reference to the accompanying drawings.

Figure 2:
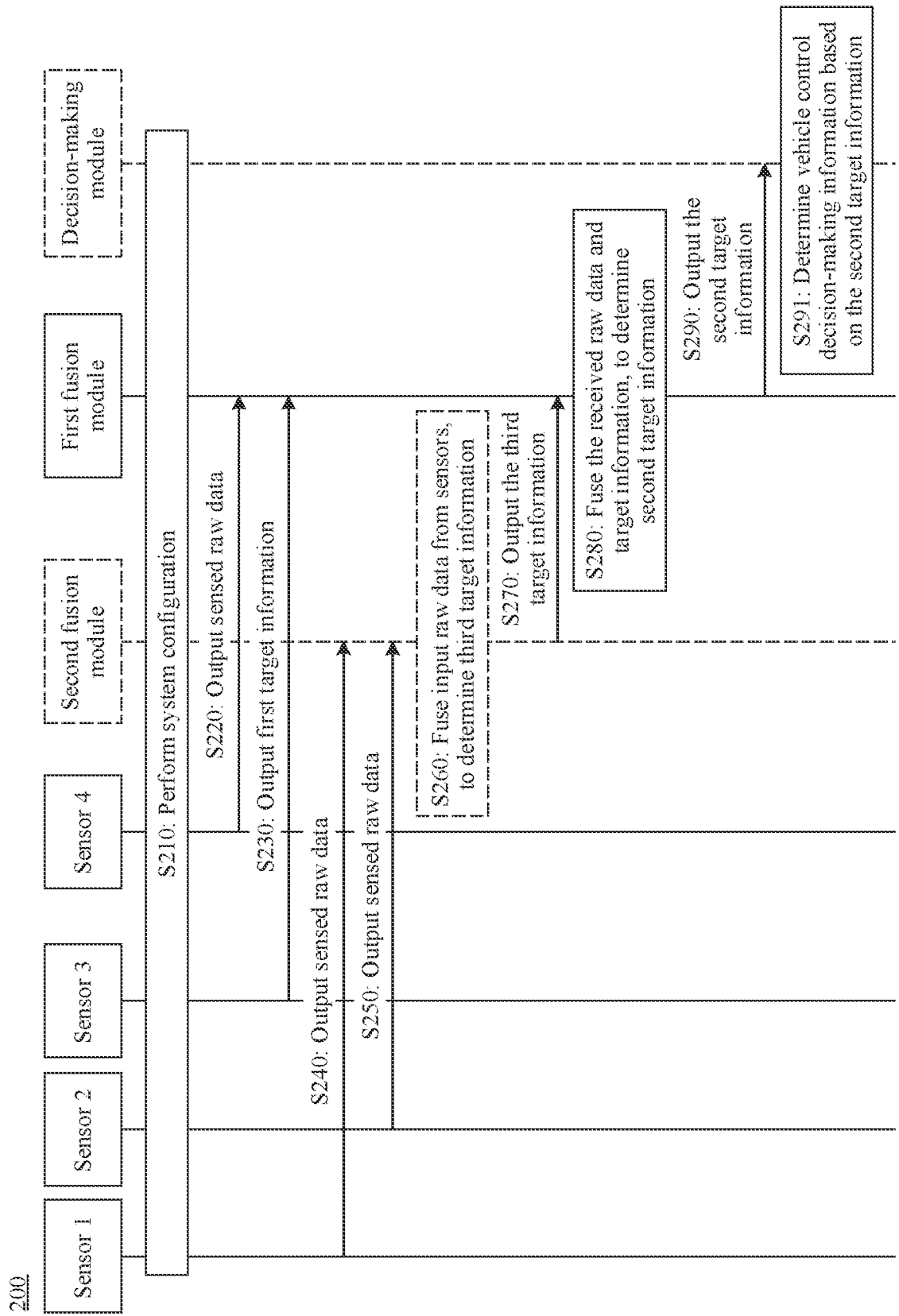
FIG. 2 is a schematic flowchart of an example of a vehicle sensor data processing method according to an embodiment of this application.

FIG. 2 is a schematic flowchart of an example of a vehicle sensor data processing method according to an embodiment of this application.

S210: Perform system configuration.

The system configuration may be a factory configuration of a vehicle, or may be a system configuration corresponding to a driving mode of the vehicle. To be specific, one driving mode of the vehicle corresponds to one system configuration. In one driving mode, an output data type of a sensor and a type of data fused by a fusion module are unchanged. Alternatively, the system configuration may be a real-time configuration, and an output data type of a sensor in a system and/or a type of data fused by a fusion module are/is adjusted based on a real-time driving status. However, this application is not limited thereto.

In an implementation, the output data type of the sensor in the system is configured, and the output data type may be raw data or first target information. A sensor whose output data type is configured as the raw data is a first sensor, and a sensor whose output data type is configured as the first target information is a second sensor. Optionally, the output data type of the sensor may be configured by a configuration module in the system.

By way of example and not limitation, the first target information is a parameter that is related to a target and that is determined after the sensor processes sensed data. The first target information may include but is not limited to one or more of the following:

a type of the target, a speed of the target, a distance of the target, a size of the target, or an orientation of the target.

For example, the output data type of the sensor may be configured based on a location of the sensor. For example, when a vehicle autonomously drives in a cruise mode, because an obstacle in front of the vehicle and a vehicle behind the vehicle have great impact on safe driving of the vehicle, sensors distributed in the front and rear of the vehicle may be configured to output raw data. Sensors distributed on the side and top of the vehicle may be configured to output data processed by the sensors, that is, the first target information, to reduce transmission pressure. However, this application is not limited thereto.

For another example, the output data type of the sensor may be configured based on a type of the sensor. For example, a vehicle has a camera sensor, a radar, or the like. The camera sensor may be configured to output information (that is, first target information) such as a type and a size of a target obtained after the camera sensor processes a sensed image (that is, raw data of the camera sensor), to avoid an excessively large amount of transmission caused by an excessively large amount of image data information. In addition, a radar sensor may be configured to transmit raw data, so that the system can estimate a distance, a speed, and the like of a target more accurately.

In another implementation, a sensor in the system is configured as a first sensor or a second sensor. A sensor whose sensor type is configured as the first sensor outputs raw data, and a sensor whose sensor type is configured as the second sensor outputs first target information. Optionally, the type of the sensor may be configured by the configuration module in the system.

Optionally, in this implementation, the system includes a control module, and the control module is configured to configure the output data type of the sensor or the type of the sensor.

In another implementation, the sensor obtains capability information of the fusion module and/or an output data type of the sensor, and determines, based on the capability information of the sensor and/or the output data type of the sensor, to output the raw data or the first target information.

For example, an advanced driver assistance system (ADAS) includes a plurality of driving modes. After a driving mode of the ADAS is enabled, each sensor obtains capability information of the fusion module and/or an output data type of the sensor in the driving mode, and determines, based on the capability information of the fusion module and/or the output data type of the sensor in the driving mode, to output raw data or first target information.

Optionally, in this implementation, the system includes a control module, and the control module is configured to send the capability information of the fusion module and/or the output data type of the sensor to the sensor in the system.

Optionally, a data processing mode of the system may be further configured, and the data processing mode may include:

an early fusion mode, which is also referred to as raw data fusion, and means that the sensors in the system output raw data, and the fusion module fuses the raw data to determine target information;

a late fusion mode, which is also referred to as target-level data fusion, and means that the sensors in the system output target information after processing sensed data, and the fusion module fuses the target information from the sensors and then determines fused target information; or a partial fusion mode, which means that some sensors in the system provided in this application are configured to output raw data, some sensors are configured to output target information, and the fusion module may fuse the raw data and the target information from the sensors to obtain fused target information.

In the embodiment shown in FIG. 2, a sensor 1, a sensor 2, and a sensor 4 in the system are configured to output raw data, that is, the sensor 1, the sensor 2, and the sensor 4 are first sensors. A sensor 3 is configured to output target information, that is, the sensor 3 is a second sensor. It should be noted that FIG. 2 is merely a schematic flowchart for describing a solution of this application. Sequence numbers of sensors, a quantity of first sensors, and a quantity of second sensors in FIG. 2 are merely examples. The quantity of first sensors and the quantity of second sensors included in the system are not limited in this application. During specific implementation, the quantity of first sensors and the quantity of second sensors may be determined based on a specific case.

S220: The sensor 4 outputs sensed raw data to a first fusion module.

After sensing the target, the sensor 4 outputs the sensed raw data to the first fusion module. Correspondingly, the first fusion module receives the raw data obtained by the sensor 4 by sensing the target.

S230: The sensor 3 outputs first target information to the first fusion module.

The sensor 3 obtains raw data of the target after sensing the target. Because the sensor 3 is configured to output the target information, the sensor 3 processes the raw data of the target to determine the first target information. For example, the first target information may be determined by the sensor 3 based on the raw data of the target. The first target information includes but is not limited to one or more of a type, a speed, a size, or an orientation of the target. Optionally, when the first target information includes a plurality of pieces of the foregoing information, the first target information may also be referred to as a first target information set.

Optionally, the system further includes a second fusion module, and the second fusion module is connected to one or more first sensors.

S240: The sensor 1 outputs sensed raw data to the second fusion module.

After sensing the target, the sensor 1 outputs the sensed raw data to the second fusion module. Correspondingly, the second fusion module receives the raw data obtained by the sensor 1 by sensing the target.

S250: The sensor 2 outputs sensed raw data to the second fusion module.

After sensing the target, the sensor 2 outputs the sensed raw data to the second fusion module. Correspondingly, the second fusion module receives the raw data obtained by the sensor 2 by sensing the target.

S260: The second fusion module fuses the input raw data from the sensors, to determine third target information.

The second fusion module fuses the received raw data from the sensors, and determines the third target information by fusing the raw data from the sensors. The third target information may include but is not limited to one or more of a type, a speed, a distance, a size, or an orientation of the target. Optionally, when the third target information includes a plurality of pieces of the foregoing information, the third target information may also be referred to as a third target information set.

For example, the sensor 1 and the sensor 2 are two sensors distributed in the rear of the vehicle. After fusing the raw data from the sensor 1 and the sensor 2, the second fusion module may determine information such as a type, a speed, a distance, a size, and an orientation of the target behind the vehicle, to generate the third target information.

S270: The second fusion module outputs the third target information to the first fusion module.

After fusing the raw data from the sensor 1 and the sensor 2 to determine the third target information, the second fusion module outputs the third target information to the first fusion module. Correspondingly, the first fusion module receives the third target information from the second fusion module.

S280: The first fusion module fuses the received raw data and target information, to determine second target information.

The first fusion module fuses the first target information from the sensor 3 and the raw data from the sensor 4, and when the system includes the second fusion module, the first fusion module further fuses the third target information. The first fusion module fuses the received raw data and target information, to determine the second target information. The second target information is related information that is of the target and that is determined by the first fusion module based on the received data and target information. The second target information may include but is not limited to information such as a type, a speed, a distance, a size, or an orientation of the target. Optionally, when the second target information includes a plurality of pieces of the foregoing information, the second target information may also be referred to as a second target information set.

For example, the vehicle is in an adaptive cruise mode. Because a target in front of the vehicle is important for safe driving of the vehicle in a traveling process, the sensor 4 distributed in the front of the vehicle is configured to output raw data to the first fusion module. In addition, information about a target behind the vehicle is also important for deceleration, braking, and the like of the vehicle. Therefore, the sensor 1 and the sensor 2 distributed in the rear of the vehicle are configured to output raw data to the second fusion module. The second fusion module determines accurate information about the target behind the vehicle, that is, the third target information, by comprehensively referring to and fusing the raw data from the sensor 1 and the sensor 2, and outputs the third target information to the first fusion module for reference. In addition, targets on two sides of the vehicle have slight impact on a traveling process of the vehicle, and the sensor 3 distributed on a side of the vehicle may be configured to output the processed first target information, to reduce system overheads caused by raw data transmission by the sensor. After receiving the raw data and the target information from the sensors and the target information from the second fusion module, the first fusion module fuses data from sensors in all parts of the vehicle or processed information to obtain comprehensive information of targets around the vehicle and generate the second target information.

It should be noted that the raw data from the sensors, the first target information, the second target information, and the third target information in this application may be related information of a same target. For example, the first fusion module fuses raw data sensed by a sensor, first target information obtained by a sensor by processing raw data, and third target information determined by the second fusion module that are for one target (for example, an obstacle or a signpost), to determine second information of the target. In other words, the first fusion module fuses a plurality of types of information of the target to determine the second information of the target. However, this application is not limited thereto. Alternatively, the raw data from the sensors, the first target information, the second target information, and the third target information in this application may be related information of a plurality of targets. The first fusion module fuses information about a plurality of targets around the vehicle, determines a comprehensive situation around the vehicle, and generates the second target information. However, this application is not limited thereto.

In an implementation, the first fusion module has a decision-making capability, or the first fusion module and a decision-making module may be a same module. After determining the second target information, the first fusion module performs S291 to determine vehicle control decision-making information based on the second target information. For example, after comprehensively determining information about targets in front of, behind, and on the two sides of the vehicle based on received information, the first fusion module makes a control decision on a subsequent driving status of the vehicle, for example, determines control decision-making information for continuing to move forward. Alternatively, when determining that an obstacle appears in front of the vehicle and no obstacle appears behind the vehicle, the first fusion module determines control decision-making information for braking. Alternatively, when determining that an obstacle appears in front of the vehicle and no obstacle appears on the side of the vehicle, the first fusion module determines control decision-making information for controlling the vehicle to change a lane.

In another implementation, the first fusion module and a decision-making module in the system are independent modules. After determining the second target information, the first fusion module performs S290 to output the second target information to the decision-making module. Correspondingly, the decision-making module receives the input second target information, and determines vehicle control decision-making information based on the second target information in S291.

In another implementation, the first fusion module is connected to the control module in the system, the first fusion module outputs the second target information to the control module, and the control module controls a vehicle status based on the second target information, or the control module determines vehicle control decision-making information based on the second target information, and controls a vehicle status based on the vehicle control decision-making information. According to the foregoing solution, based on distribution of sensors in the system, importance of data, or the like, some sensors in the system are configured to output raw data, and some sensors are configured to output target information obtained after processing raw data. That is, some sensors output raw data with a large transmission amount, and some sensors output target information with a small transmission amount, to reduce overheads caused by transmission and processing of a large amount of data while ensuring fusion and sensing performance.

It should be noted that sequence numbers of the foregoing processes do not mean execution sequences in embodiments of this application. The execution sequences of the processes should be determined based on functions and internal logic of the processes, and should not be construed as any limitation on the implementation processes of embodiments of this application.

Figure 3:
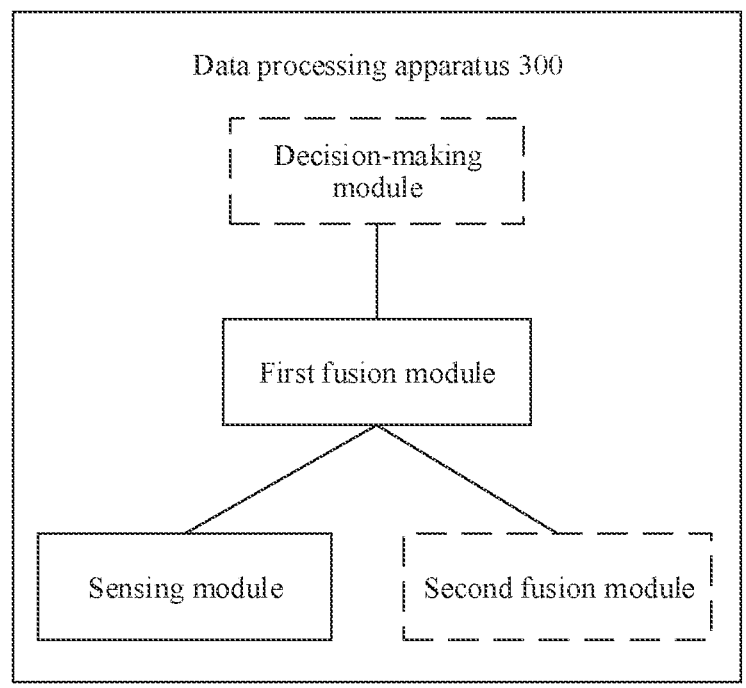
FIG. 3 is a schematic diagram of a vehicle sensor data processing apparatus according to an embodiment of this application.

FIG. 3 is a schematic diagram of a vehicle sensor data processing apparatus according to an embodiment of this application. The vehicle sensor data processing apparatus provided in this embodiment of this application may include modules configured to perform the method 200 in FIG. 2, for example, a sensing module and a first fusion module. The sensing module may include the foregoing at least two sensors. Optionally, the data processing apparatus may further include the foregoing second fusion module and decision-making module.

This application further provides a vehicle sensor data processing apparatus. The data processing apparatus may correspond to the foregoing first fusion module and the foregoing second fusion module. The processing apparatus may include at least one processor that may be configured to perform the method 200 in FIG. 2. Optionally, the communications apparatus further includes a memory, and the at least one processor is coupled to the memory. Optionally, the vehicle sensor data processing apparatus further includes a communications interface, and the processor is coupled to the communications interface. The communications interface may be an input/output interface. The input/output interface may be an input/output circuit.

This application further provides a processor, including an input circuit, an output circuit, and a processing circuit. The processing circuit is configured to receive a signal by using the input circuit, and transmit a signal by using the output circuit, so that the processor can be configured to perform the method 200 in FIG. 2.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example but not limited to, a receiver. A signal output by the output circuit may be output to, for example but not limited to, a transmitter and transmitted by the transmitter. The input circuit and the output circuit may be a same circuit, where the circuit is used as the input circuit and the output circuit at different moments. Specific implementations of the processor and the circuits are not limited in embodiments of this application.

It should be understood that, for a related data exchange process, for example, sending data or information may be a process of outputting data or information from the processor, and receiving data or information may be a process of receiving input data or information by the processor. Specifically, data output by the processor may be output to the transmitter, and input data received by the processor may be from the receiver. The transmitter and the receiver may be collectively referred to as a transceiver.

The processor may be a chip. The processor may be implemented by using hardware, or may be implemented by using software. When implemented by using the hardware, the processor may be a logic circuit, an integrated circuit, or the like. When implemented by using the software, the processor may be a general-purpose processor, and is implemented by reading software code stored in a memory. The memory may be integrated into the processor, or may be located outside the processor and exist independently.

This application further provides a computer program product. The computer program product includes a computer program (also referred to as code or instructions). When the computer program is run, a computer is enabled to perform the method 200 in FIG. 2.

This application further provides a computer-readable medium. The computer-readable medium stores a computer program (also referred to as code or instructions). When the computer program is run on a computer, the computer is enabled to perform the method 200 in FIG. 2.

An embodiment of this application further provides a processing apparatus, including a processor and an interface. The processor is configured to perform the method in any one of the foregoing method embodiments.

It should be understood that the processing apparatus may be one or more chips. For example, the processing apparatus may be a field programmable gate array (FPGA), an application-specific integrated circuit (ASIC), a system on chip (SoC), a central processing unit (CPU), a network processor (NP), a digital signal processor (DSP), a micro controller unit (MCU), a programmable logic device (PLD), or another integrated chip.

In an implementation process, steps in the foregoing methods may be completed by using an integrated logic circuit of hardware in the processor or by using instructions in a form of software. The steps of the method disclosed with reference to embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps of the foregoing method in combination with hardware of the processor. To avoid repetition, details are not described herein again.

It should be noted that, the processor in embodiments of this application may be an integrated circuit chip, and has a signal processing capability. In an implementation process, steps in the foregoing method embodiments may be completed by using an integrated logic circuit of hardware in the processor or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or execute the methods, steps, and logical block diagrams disclosed in embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps of the foregoing method in combination with hardware of the processor.

It may be understood that the memory in embodiments of this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that, the memory of the systems and methods described in this specification includes but is not limited to these and any other memories of appropriate types.

All or some of the foregoing embodiments may be implemented by using software, hardware, firmware, or any combination thereof. When software is used to implement the embodiments, the embodiments may be implemented entirely or partially in a form of a computer program product. The computer program product includes one or more computer instructions. When the computer instructions are loaded and executed on the computer, all or some of the procedures or functions according to embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a high-density digital video disc (DVD)), a semiconductor medium (for example, a solid-state drive (solid state disc, SSD)), or the like.

Terms such as "component", "module", and "system" used in this specification indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. The components may communicate by using a local and/or remote process and based on, for example, a signal having one or more data packets (for example, data from two components interacting with another component in a local system and/or a distributed system, and/or across a network such as the internet interacting with other systems by using the signal).

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus, and method may be implemented in other manners. For example, the foregoing apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electrical, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objective of the solutions of embodiments.

In addition, functional units in embodiments of this application may be integrated into one processing unit, or each of the units may exist alone physically, or two or more units may be integrated into one unit.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A vehicle sensor data processing system, wherein the system comprises at least two sensors and at least two processors, wherein:
    the at least two sensors comprise at least one first sensor and at least one second sensor, the at least one first sensor is configured to output first raw data sensed by the at least one first sensor, and the at least one second sensor is configured to output first target information based on second raw data sensed by the at least one second sensor; and
    the at least two processors comprise a first processor and a second processor, the second processor is configured to output third target information to the first processor based on the first raw data from the at least one first sensor, and the first processor is configured to output second target information based on the first raw data from the at least one first sensor, the first target information from the at least one second sensor, and the third target information.

2. The system according to claim 1, wherein an output data type of a sensor in the at least two sensors is configured as a raw data type or a date type of the first target information, a sensor whose output data type is configured as the raw data type is the first sensor, and a sensor whose output data type is configured as the date type of the first target information is the second sensor; or
    a sensor in the at least two sensors is configured as the first sensor or the second sensor.

3. The system according to claim 2, wherein the system further comprises:
    a third processor configured to configure a sensor in the at least two sensors.

4. The system according to claim 1, wherein at least one sensor in the at least two sensors obtains at least one of capability information of the at least two processors or output data type information of the at least one sensor, and determines, based on the at least one of the capability information or the output data type information, to output the first raw data, the second raw data, or the first target information.

5. The system according to claim 4, wherein the system further comprises:
    a third processor configured to send the at least one of the capability information of the at least two processors or the output data type information to the at least one sensor in the at least two sensors.

6. The system according to claim 1, wherein the system further comprises:
    a third processor configured to output vehicle control decision-making information based on the second target information.

7. A vehicle sensor data processing method, wherein the method is performed by a vehicle sensor data processing system, the system comprises at least two sensors and at least two processors, the at least two sensors comprise at least one first sensor and at least one second sensor, and the method comprises:
    outputting, by the at least one first sensor, first raw data sensed by the at least one first sensor;
    outputting, by the at least one second sensor, first target information based on second raw data sensed by the at least one second sensor;
    outputting, by a second processor of the at least two processors, third target information to a first processor of the at least two processors based on the first raw data from the at least one first sensor; and
    outputting, by the first processor, second target information based on the first raw data from at least one first sensor, the first target information from the at least one second sensor, and the third target information.

8. The method according to claim 7, wherein an output data type of a sensor in the at least two sensors is configured as a raw data type or a date type of the first target information, a sensor whose output data type is configured as the raw data type is the first sensor, and a sensor whose output data type is configured as the date type of the first target information is the second sensor; or
    a sensor in the at least two sensors is configured as the first sensor or the second sensor.

9. The method according to claim 8, wherein the system further comprises a third processor, and the method further comprises:
    configuring, by the third processor, the output data type of the sensor in the at least two sensors or a type of the sensor in the at least two sensors.

10. The method according to claim 7, wherein at least one sensor in the at least two sensors obtains at least one of capability information of the at least two processors or output data type information of the at least one sensor, and determines, based on the at least one of the capability information or the output data type information, to output the first raw data, the second raw data, or the first target information.

11. The method according to claim 10, wherein the system further comprises a third processor, and the method further comprises:
    sending, by the third processor, the at least one of the capability information of the at least two processors or the output data type information to the at least one sensor in the at least two sensors.

12. The method according to claim 7, wherein the system further comprises a third processor, and the method further comprises:

outputting, by the third processor, vehicle control decision-making information based on the second target information.

13. A vehicle sensor data processing method, wherein the method comprises:
   receiving, by a first processor of at least two processors, first raw data sensed by at least one first sensor and first target information from at least one second sensor, wherein the first target information is based on second raw data sensed by the at least one second sensor; and
   outputting, by the first processor, second target information based on the first raw data, the first target information, and third target information, wherein the third target information is from a second processor of the at least two processors.

* * * * *